(12) United States Patent
Duan (10) Patent No.: US 8,291,310 B2
(45) Date of Patent: Oct. 16, 2012

(54) DELTA-SAVING IN XML-BASED DOCUMENTS

(75) Inventor: Qiyang Duan, Shenzeh (CN)

(73) Assignee: Oracle International Corporation, Redwood Shores, CA (US)

( * ) Notice: Subject to any disclaimer, the term of this patent is extended or adjusted under 35 U.S.C. 154(b) by 1011 days.

(21) Appl. No.: 11/847,213

(22) Filed: Aug. 29, 2007

(65) Prior Publication Data

US 2009/0063949 A1    Mar. 5, 2009

(51) Int. Cl.
*G06F 17/00*    (2006.01)
(52) U.S. Cl. ......... 715/234; 715/229; 715/237; 715/239
(58) Field of Classification Search .................. 715/229, 715/234, 239, 237
See application file for complete search history.

(56) References Cited

U.S. PATENT DOCUMENTS

| | | | |
|---|---|---|---|
| 6,018,747 A | 1/2000 | Burns et al. | |
| 6,061,697 A * | 5/2000 | Nakao ............................ | 715/229 |
| 6,414,610 B1 | 7/2002 | Smith | |
| 6,598,055 B1 | 7/2003 | Keesey et al. | |
| 6,671,853 B1 | 12/2003 | Burkett et al. | |
| 6,883,137 B1 | 4/2005 | Girardot et al. | |
| 6,941,510 B1 | 9/2005 | Ozzie et al. | |
| 6,996,571 B2 | 2/2006 | McConnell | |
| 7,013,425 B2 | 3/2006 | Kataoka | |
| 7,031,956 B1 | 4/2006 | Lee et al. | |
| 7,090,318 B2 | 8/2006 | Brown | |
| 7,302,489 B2 * | 11/2007 | Kraft ............................. | 709/230 |
| 7,340,673 B2 * | 3/2008 | Malone .......................... | 715/255 |
| 7,464,082 B2 | 12/2008 | Weiss | |
| 7,484,171 B2 * | 1/2009 | Jeon et al. ..................... | 715/229 |
| 7,586,839 B2 * | 9/2009 | Childress et al. .............. | 370/216 |
| 7,730,104 B2 * | 6/2010 | Uchiyama et al. ............. | 707/802 |
| 7,779,350 B2 * | 8/2010 | Bender et al. .................. | 715/235 |
| 7,831,540 B2 * | 11/2010 | Medi et al. ..................... | 707/601 |
| 7,877,356 B1 * | 1/2011 | Guiheneuf et al. ............ | 707/622 |
| 8,046,699 B2 * | 10/2011 | Mohan et al. .................. | 715/751 |
| 8,073,841 B2 * | 12/2011 | Tarachandani et al. ....... | 707/716 |
| 8,150,818 B2 * | 4/2012 | Van Der Linden et al. ... | 707/705 |
| 2001/0037346 A1 | 11/2001 | Johnson | |

(Continued)

FOREIGN PATENT DOCUMENTS

WO    WO 03107576    12/2003

(Continued)

OTHER PUBLICATIONS

U.S. Appl. No. 11/777,484, filed Jul. 13, 2007 to Kongyi Zhou et al. entitled "Scalable DOM Implementation".

(Continued)

*Primary Examiner* — Stephen Hong
*Assistant Examiner* — Matthew Ludwig
(74) *Attorney, Agent, or Firm* — Hickman Palermo Truong Becker Bingham Wong LLP; Daniel D. Ledesma (57) ABSTRACT

Techniques for incrementally saving documents are provided. A document processor reads a document that is represented by a tree of nodes. The document processor, in response to an instruction to make a change to the tree, determines a set of nodes from the tree that are affected by the change. The document processor sends an instruction to transfer and store only the set of nodes without causing nodes outside of the set to be stored.

20 Claims, 5 Drawing Sheets

U.S. PATENT DOCUMENTS

| | | | |
|---|---|---|---|
| 2002/0075514 A1 | 6/2002 | Wright et al. | |
| 2002/0111965 A1 | 8/2002 | Kutter | |
| 2002/0123993 A1* | 9/2002 | Chau et al. | 707/5 |
| 2003/0046317 A1 | 3/2003 | Cseri et al. | |
| 2003/0069881 A1 | 4/2003 | Huttunen | |
| 2003/0093626 A1 | 5/2003 | Fister | |
| 2003/0101235 A1* | 5/2003 | Zhang | 709/218 |
| 2004/0060006 A1 | 3/2004 | Lindblad et al. | |
| 2004/0068509 A1 | 4/2004 | Garden et al. | |
| 2004/0068696 A1 | 4/2004 | Seyrat et al. | |
| 2004/0143791 A1 | 7/2004 | Ito et al. | |
| 2004/0148278 A1 | 7/2004 | Milo et al. | |
| 2004/0267760 A1 | 12/2004 | Brundage et al. | |
| 2004/0268244 A1 | 12/2004 | Levanoni et al. | |
| 2004/0268305 A1 | 12/2004 | Hogg et al. | |
| 2005/0044113 A1* | 2/2005 | Manikutty et al. | 707/104.1 |
| 2005/0050054 A1 | 3/2005 | Clark et al. | |
| 2005/0086608 A1* | 4/2005 | Roessler | 715/764 |
| 2005/0091188 A1 | 4/2005 | Pal et al. | |
| 2005/0097084 A1 | 5/2005 | Balmin et al. | |
| 2005/0108209 A1 | 5/2005 | Beyer et al. | |
| 2005/0114316 A1 | 5/2005 | Fontoura et al. | |
| 2005/0187973 A1 | 8/2005 | Brychell et al. | |
| 2005/0228791 A1 | 10/2005 | Thusoo et al. | |
| 2005/0228828 A1 | 10/2005 | Chandrasekar et al. | |
| 2005/0278289 A1 | 12/2005 | Gauweiler et al. | |
| 2005/0278616 A1 | 12/2005 | Eller | |
| 2005/0289125 A1 | 12/2005 | Liu et al. | |
| 2006/0021246 A1 | 2/2006 | Schulze et al. | |
| 2006/0031757 A9 | 2/2006 | Vincent | |
| 2006/0136508 A1 | 6/2006 | Idicula et al. | |
| 2006/0143340 A1 | 6/2006 | Labar | |
| 2006/0167912 A1 | 7/2006 | Coulson et al. | |
| 2006/0168513 A1 | 7/2006 | Coulson et al. | |
| 2006/0195783 A1 | 8/2006 | Davis et al. | |
| 2006/0212467 A1 | 9/2006 | Murthy et al. | |
| 2006/0242559 A1 | 10/2006 | Krantz et al. | |
| 2006/0277179 A1 | 12/2006 | Bailey | |
| 2007/0044012 A1 | 2/2007 | Suver et al. | |
| 2007/0079234 A1 | 4/2007 | McCollum et al. | |
| 2008/0077606 A1 | 3/2008 | Fang et al. | |
| 2008/0098001 A1 | 4/2008 | Gupta et al. | |
| 2008/0098019 A1 | 4/2008 | Sthanikam et al. | |
| 2008/0098020 A1 | 4/2008 | Gupta et al. | |
| 2008/0104025 A1* | 5/2008 | Dharamshi et al. | 707/3 |
| 2008/0195933 A1* | 8/2008 | McKellar et al. | 715/234 |

FOREIGN PATENT DOCUMENTS

| | | |
|---|---|---|
| WO | WO 2006026534 | 3/2006 |

OTHER PUBLICATIONS

"WD97: How Word for Windows Uses Temporary Files" dated Nov. 16, 2006 (6 pages) downloaded from the Internet on Jan. 28, 2011 < http://support.microsoft.com/kb/89247 >.

Bouchou, B. et al., "Updates and Incremental Validation of XML Documents" LNCS 2921 (2004) pp. 216-232.

Catania, B. et al., "Lazy XML Updates: Laziness as a Virtue of Update and Structural Join Efficiency" SIGMOD (Jun. 14-16, 2005) 12 pages.

Kanne, C. et al., "Efficient storage of XML data" (Dec. 13, 1999) 22 pages.

Kim, T. et al., "An Efficient XML Index Technique with Relative Position Coordinate" Dept. of Computer Science, Seoul, South Korea, WSEAS Transactions on Information Science and Applications, vol. 2, No. 4 (Apr. 2005) pp. 373-379.

La Fontaine, R. et al., "A Delta Format for XML: Identifying Changes in XML Files and Representing the Changes in XML" (2001) 26 pages.

Ozden, M., "A Binary Encoding for Efficient XML Processing" Dec. 17, 2002; pp. 81-102.

PCT/US2007/010163, Notification of Transmittal of the International Search Report and the Written Opinion of the International Searching Authority, Oct. 12, 2007, 12 pages.

Wong, R. et al., "The Extended XQL for Querying and Updating Large XML Databases" DocEng'OI (Nov. 9-10, 2001) 10 pages.

Yu, J. et al., "Dynamically Updating XML Data; Numbering Scheme Revisited," Internet and Web Information Systems, vol. 8 (2005) pp. 5-26.

* cited by examiner

Redline comparison 300

Adfafadfafa
afadfadfafadf
wwfffff wwwwww
eeeeeeeeeeee bbbbbbbbbbb

FIG. 5 ions in the figures of the accompanying
DELTA-SAVING IN XML-BASED DOCUMENTS

FIELD OF THE INVENTION

The present invention relates to saving changes to XML-based documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Individuals and companies generate an enormous amount of data in documents and store those documents on file servers, which use network file system (NFS), server message block SMB, or other protocols to send and receive document to and from clients on a network. If a user desires to view or edit a document, then the user normally maps a folder on a remote file server to a local folder or drive. A document editor (such as OpenOffice™ or Microsoft Office™) treats the document exactly the same way as a local file. Thus, when the editor opens a document, the document editor reads the entire document from the file server. For larger document, some editors may only read only the accessed portion of documents. After the user changes the document, no matter how large or small the change, the document editor saves the entire document.

For example, user Tom writes a book with hundreds of pages and graphs using a traditional document editor. The corresponding document requires five megabytes (5 MB) of data. Each time user Tom changes a paragraph and saves the document, the document editor saves the entire 5 MB to disk. Such constant saving leads to significant performance issues.

If the document is stored on a remote server, then the performance issues become more significant. For example, if network bandwidth is 100 Kb/s, the response time for saving a 5 MB file is (5000 K*8 b/B)/100/60=6.7 minutes, which is not acceptable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for saving a document. A document processor (or an associated plug-in) causes only changes to a document to be saved instead of saving the entire document, including portions of the document that have not been changed.

A document comprises a tree of nodes (or a set of such trees). The document processor receives a change instruction (e.g., from a user) and applies the corresponding change to a set of one or more nodes in the tree. In response to a user's instruction to save (or after a period of time) the document, the document processor (or plug-in) causes only the set of nodes that are changed to be set without saving nodes in the tree that were not changed. As a result, a save operation is much faster and, if the document is saved on a remote server, much network bandwidth is preserved.

XML

The number of businesses exchanging information electronically is proliferating. Businesses that exchange information have recognized the need for a common standard for representing data. Extensible Markup Language ("XML") is rapidly becoming that common standard.

XML describes and provides structure to a body of data, such as a file or data packet. The XML standard provides for tags that delimit sections of XML data referred to as XML elements. HTML is a form of XML.

An element may contain various types of data, including attributes and other elements. An element that is contained by another element is referred to as a descendant of that other element. By defining an element that contains attributes and descendant elements, the XML entity defines a hierarchical relationship between the element, its descendant elements, and its attributes. A set of elements that have such a hierarchical relationship is referred to herein as an XML tree.

Document Object Model

There are many ways to define structures for representing, or modeling, XML trees. In response to the development of various proprietary models, the World Wide Web Consortium (W3C) promulgated the Document Object Model (DOM) standard. The proprietary models are called intermediate DOMs. An XML tree that conforms to any object model, including the standard DOM, is referred to hereinafter as a "DOM tree."

The standard DOM defines the logical structure of a logical set of XML data (also referred to as "documents") and the way the document is accessed and manipulated. One important objective for the standard DOM is to provide a standard programming interface that can be used in a wide variety of environments and applications. The standard DOM is designed to be used with any programming language.

In order for a computer to operate on an XML tree, an in-memory representation of the XML tree is generated. In general, an XML tree is read from a storage device (e.g., a disk that stores files that contain XML data) to create in-memory data structures used to represent an XML tree. The in-memory data structures are manipulated by applications running on the computer. Typically, the applications access and manipulate the data structures through a set of routines or functions designed for this purpose.

The term "DOM implementation" refers to a definition of data structures used to represent a DOM tree, functions or routines that are designed and used to interact with the data structures, or a combination thereof. A DOM implementation may define only data structures. A DOM implementation may be a set of object classes that define attributes and methods.

The term "application software" is used to refer to a set of interrelated software modules that, when executed, provide a particular service or functionality. The term is used to refer to a source code version of the software modules, an executable or runtime version of the software modules, which may be contained in one or more executable programs or files, or versions of the modules stored in a library as object code.

The term "application" is used to refer to one or more processes that, when executed, execute the executable or runtime version of the software modules and maintain program variables.

Typically, a DOM tree is represented as a node tree, which is a set of linked nodes that are hierarchically related. A node in the node tree represents, for example, an element or an attribute. Links between a node and another node represent a hierarchal tree relationship between the nodes and their corresponding elements. For example, a node corresponding to a parent element may be linked to nodes representing child elements of the parent element.

W3C specifications define a common set of DOM APIs. These include the DOM Level 3 Core Specification (W3C recommendation 7 Apr. 2004) (herein Level 3 Core Specification), the DOM Level 2 Core Specification (W3C recommendation 13 Nov. 2000) (herein Level 2 Core Specification), and the DOM Level 1 Specification (W3C recommendation 1 Oct. 1998) (herein Level 1 Specification), the contents of which are incorporated herein by reference.

An XML document is a document that contains one or more XML elements that may or may not conform to an XML schema. When an XML document is read from disk, the amount of memory required to maintain a corresponding DOM tree is typically ten times larger than the XML document.

A Technique for Saving Changes to a Document

Figure 1:
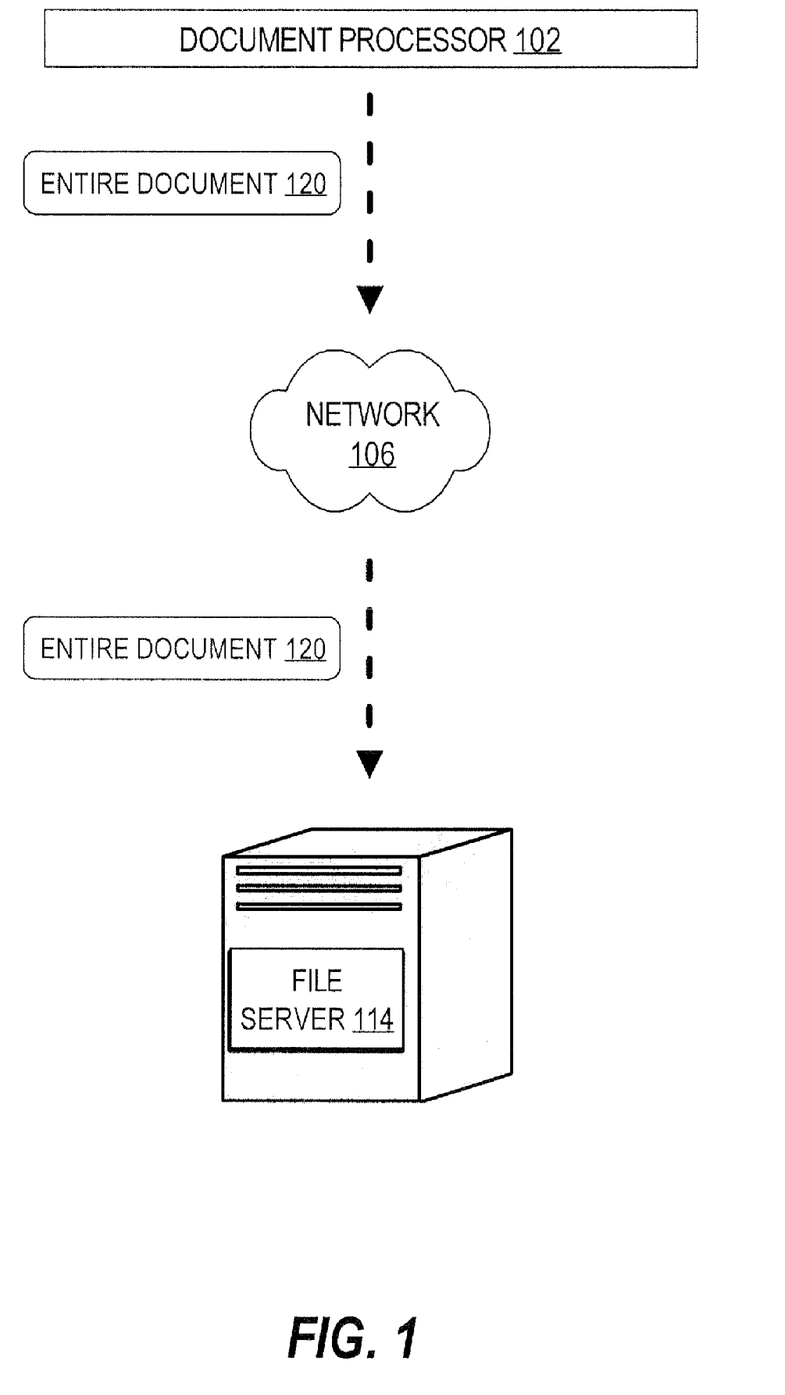
FIG. 1 illustrates a system architecture for saving changes to a document.

FIG. 1 illustrates a technique for saving changes to a document. According to this technique, a document processor 102 requests, via a network 106, a document 120 from a file server 114. After document processor 102 receives an instruction to change document 120, document processor 102 sends the entire document 120 to file server 114, via network 106. Document processor 102 sends the entire document 120 regardless of the size of the change. After multiple save instructions of a relatively large document, network bandwidth decreases significantly. Additionally, the response time was relatively long under this approach.

File server 114 receives documents from one or more client machines in network 106, stores those documents, and retrieves documents based on requests from one or more client machines in network 106.

Figure 2:
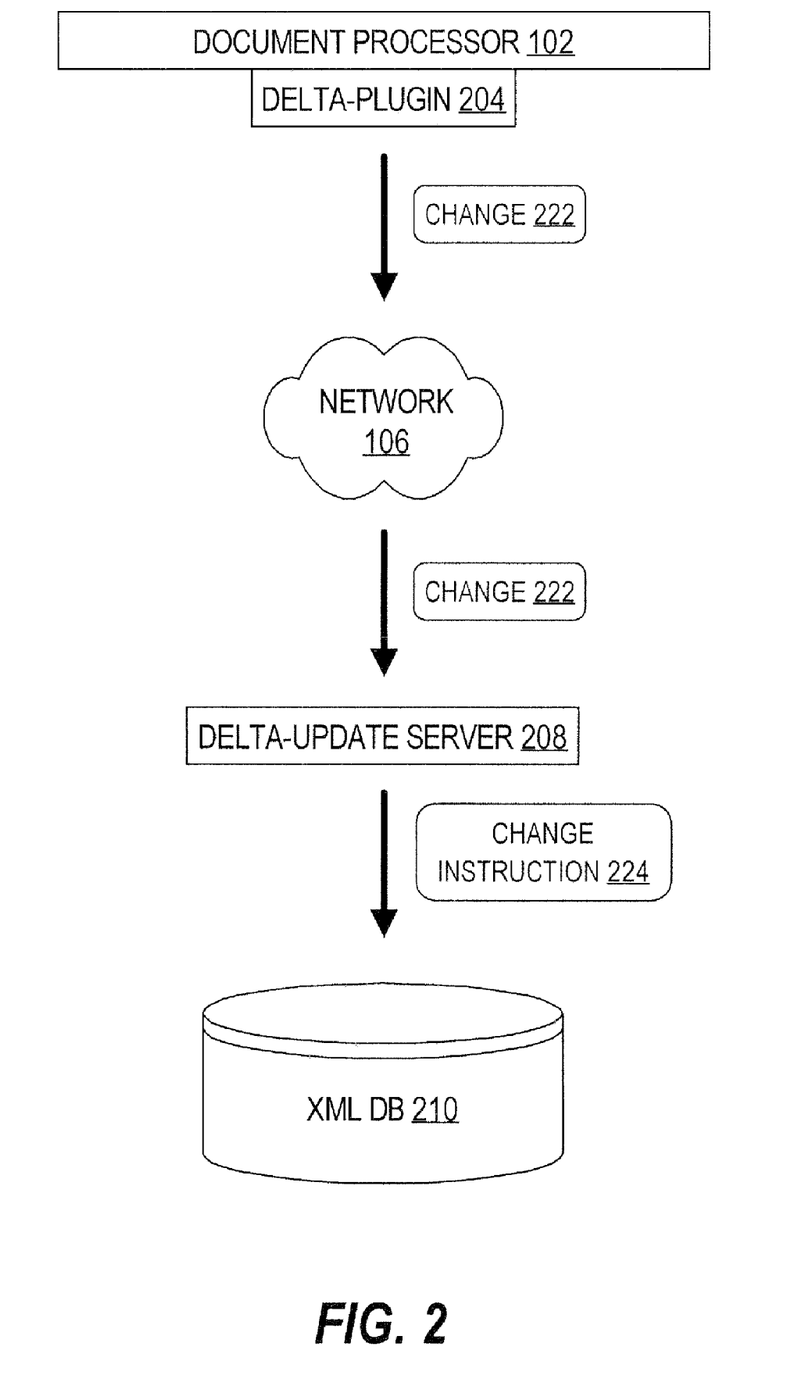
FIG. 2 illustrates an example system architecture for saving a change to a document, according to an embodiment of the invention.

Network 106 may be implemented by any medium or mechanism that provides for the exchange of data between document processor 102 and file server 114 and a delta-update server 208. Examples of network 106 include, without limitation, a network such as a Local Area Network (LAN), Wide Area Network (WAN), Ethernet or the Internet, or one or more terrestrial, satellite, or wireless links.

Example System Architecture

FIG. 2 illustrates a technique in the context of an example system architecture for saving a change to a document, according to an embodiment of the invention. Non-limiting examples of document processor 102 include OpenOffice™ and Microsoft Office™. Document processor 102 may perform a number of functions including, but not limited to, reading documents (e.g., from a local drive), displaying documents, and modifying the display of documents in response to users' commands.

Document processor 102 might process many types of documents of varying formats. One type of document that document processor 102 processes is a document that comprises a tree of nodes. Such a document may be, for example, an XML document. When the document is read into memory, document processor 102 generates a DOM tree (described previously) to represent the document.

Delta-Saving Elements in the Example System Architecture

According to an embodiment of the invention, document processor 102 is associated with a delta-plugin 204. Delta-plugin 204 comprises one or more modules that determine changes to a DOM tree. The changes are eventually reflected in persistent storage, such as a XML DB 210. Although document processor 102 changes a DOM tree and not the actual document that is persistently stored, a change to one or more portions of a DOM tree is referred to hereinafter as a "document change."

In a related embodiment, document processor 102 comprises the functionality of delta-plugin 204.

Document changes may be initiated by either user instructions or by automatic processes. Non-limiting examples of document changes include adding a node, deleting a node, and updating a node. Additionally, a single instruction may instruct document processor 102 to add entire subtrees to, or delete entire subtrees from, a tree.

Delta-plugin 204 may determine a document change in numerous ways. For example, delta-plugin 204 may compare a local version of a document that lacks the one or more changes with a local version of the document that contains the document change. As another example, delta-plugin 204 may have access to the document change that document processor 102 performs on the document. In this example, delta-plugin 204 "knows" which nodes are affected by the document change without performing a comparison between local versions of the document.

FIG. 2 also illustrates a delta-update server 208. Delta-update server 208 receives document changes from one or more delta-plugin modules, such as delta-plugin 204. Delta-update server 208 translates document changes into instructions that delta-update server 208 uses to subsequently store the document changes persistently in XML DB 210. Delta-update server 208 may also be configured to receive requests (e.g., from document processor 102) to retrieve documents from XML DB 210 and forward the retrieved documents to the appropriate document processor(s).

According to an example data flow, document processor receives instructions to change one or more portions of a DOM tree. Delta-plugin 204 determines which portions of the DOM tree are changed. Delta-plugin 204 sends a change 222

(as illustrated in FIG. 2) to delta-update server 208, via network 106. Delta-update server 208 translates change 222 into a change instruction 224.

XML data may be stored in a variety of different formats. A format is a particular way to encode information for storage in a computer file. Each different type of file has a different format. The format of a file typically specifies whether the file is a binary or ASCII file and how the information is organized. Non-limiting examples of formats in which XML data may be stored include simple text, node lists, and hash tables. Therefore, delta-update server 208 is responsible for translating the nodes that are affected by a document change into a format suitable for XML DB 210.

Change 222 may be a record that identifies the node(s) in the document that are affected by the change. Change 222 may also be (or may be included in) a SQL statement that delta-plugin 204 generates. In response to receiving the SQL statement, delta-update server 208 executes the SQL statement, which causes delta-update server 208 to update the one or more portions of the document, indicated by change 222, in XML DB 210.

Delta-plugin 204 may send change 222 to delta-update server 208 in response to an explicit instruction from a user to save any document changes. Alternatively, delta-plugin 204 may send change 222 to delta-update server 208 in response to the passage of a particular period of time. For example, delta-plugin 204 (or document processor 102) may be configured to automatically cause any document changes to be saved every five minutes to avoid loss of a significant amount of work if the network fails or the machine upon which document processor 102 is executing fails.

Node Identifier

In an embodiment, each node in a document is associated with a node identifier that is unique with respect to other nodes in the same document. A node identifier may be an attribute or a child element of the corresponding node.

Change 222 specifies a node identifier for one or more nodes in a document that are affected by the corresponding document change if the corresponding document change is at least a delete operation or an update operation. Change 222 includes different types of information depending on the type of the document change.

For example, a document change may be the deletion of a subtree that comprises multiple nodes. In this example, delta-plugin 204 generates change 222 to include (1) the node identifier of the root node of the subtree and (2) an indication of the type of the document change, such as "d" for delete. Delta-update server 208 receives change 222 and determines, based on change 222, that the document change is a deletion and which subtree node is to be deleted. Delta-update server 208 translates change 222 into change instruction 224 and sends instruction 224 to XML DB 210, which updates the document, stored on disk, accordingly.

As another example, a document change may be an update of a node, such as modifying the value of an attribute of the node. In this example, delta-plugin 204 generates change 222 to include (1) the node identifier of the node that is being updated, (2) the new value that will replace the old value, and (3) an indication of the type of the document change, such as "u" for update. Delta-update server 208 receives change 222 and determines, based on change 222, that the document change is an update, which node is to be updated, and the new value. Delta-update server 208 translates change 222 into change instruction 224 and sends instruction 224 to XML DB 210, which updates the document, stored on disk, accordingly.

As another example, a document change may be an addition of a node, which may be a new child of an existing node. In this example, delta-plugin 204 generates change 222 to include (1) a node identifier for the new node, (2) a name and value for any attributes of the new node, (3) an indication of the type of the document change, such as "n" for new, and (4) a node identifier for any parent node (typically only one) of the new node. Delta-update server 208 receives change 222 and determines, based on change 222, that the document change is an addition, the node identifier for the new node, the new values associated with the new node, and the node identifier for any parent nodes. Delta-update server 208 translates change 222 into change instruction 224 and sends instruction 224 to XML DB 210, which updates the document, stored on disk, accordingly.

Alternatively, another element of the system architecture (such as delta-update server 208) is configured to generate the node identifier for the new node.

Example of Data Stored in a Change Record

Figure 3:
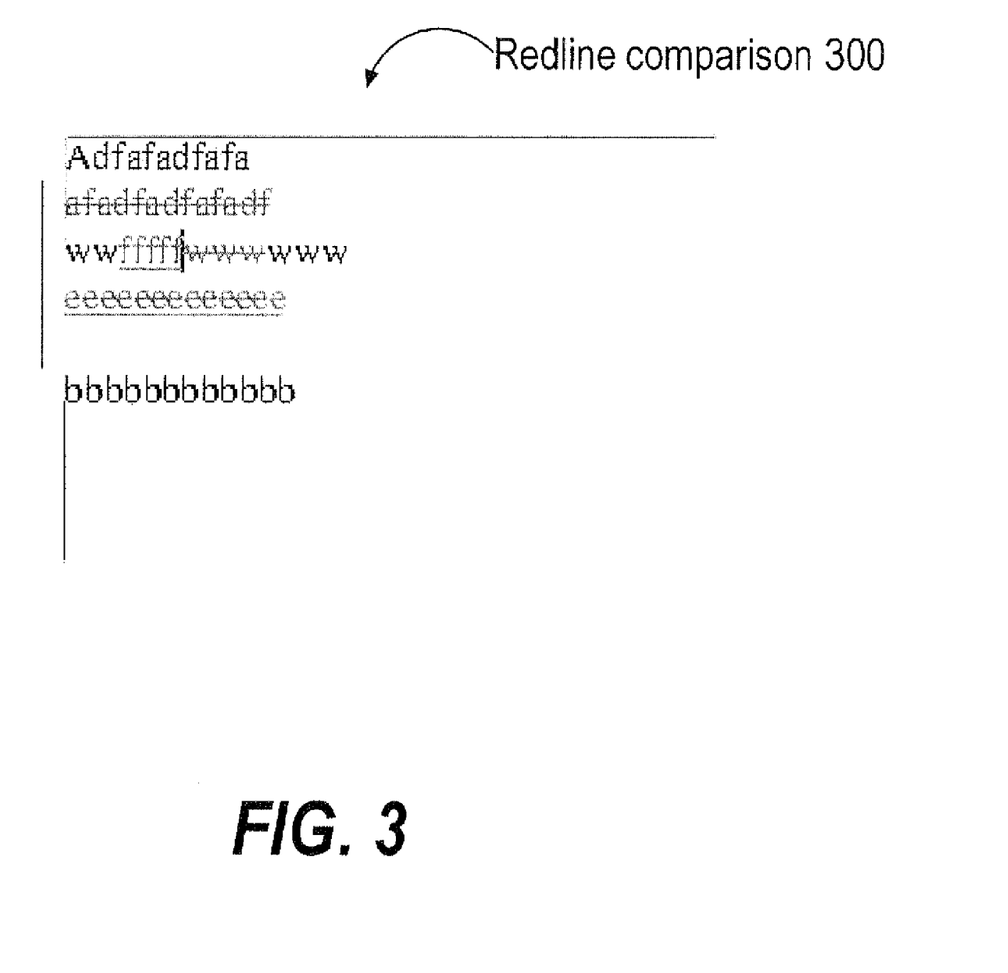
FIG. 3 illustrates a redline comparison between a version of a document before a set of modifications and a version of the document after that the set of modifications.

FIG. 3 illustrates a redline comparison 300 between a first version of a document before a set of modifications and a second version of the document after that the set of modifications. According to redline comparison 300, certain portions of the text from the first version of the document are deleted, such as "afadfadfafadf" and "www." Also, new text has been added to the first version, such as "fffff" and "eeeeeeeeeeeee" and a carriage return. Other portions of the text from the first version remain unchanged, such as "Adfafadfafa" and "bbbbbbbbbbbb."

The following is an example of data that OpenOffice™ may generate when the above set of modifications are applied to the first version of the document. Such data may be included in change 222.

```
<office:body>
    <text:tracked-changes>
        <text:changed-region text:id="ct-1355866752">
            <text:deletion>
                <office:change-info office:chg-author="unknown"
                office:chg-date-time="2007-08-23T14:40:00"/>
                <text:p text:style-name="Standard">
                    afadfadfafadf
                </text:p>
            </text:deletion>
        </text:changed-region>
        <text:changed-region text:id="ct-1352284360">
            <text:insertion>
                <office:change-info office:chg-author="unknown"
                office:chg-date-time="2007-08-23T14:40:00"/>
            </text:insertion>
        </text:changed-region>
        <text:changed-region text:id="ct-1351224048">
            <text:deletion>
                <office:change-info office:chg-author="unknown"
                office:chg-date-time="2007-08-23T14:40:00"/>
                <text:p text:style-name="Standard">www</text:p>
            </text:deletion>
        </text:changed-region>
        <text:changed-region text:id="ct-1352631944">
            <text:insertion>
                <office:change-info office:chg-author="unknown"
                office:chg-date-time="2007-08-23T14:40:00"/>
            </text:insertion>
        </text:changed-region>
    </text:tracked-changes>
```

-continued

```
<text:sequence-decls>
    <text:sequence-decl text:display-outline-level="0"
    text:name="Illustration"/>
    <text:sequence-decl text:display-outline-level="0"
    text:name="Table"/>
    <text:sequence-decl text:display-outline-level="0"
    text:name="Text"/>
    <text:sequence-decl text:display-outline-level="0"
    text:name="Drawing"/>
</text:sequence-decls>
<text:p text:style-name="Standard">
    Adfafadfafa
</text:p>
<text:p text:style-name="Standard">
    <text:change text:change-id="ct-1355866752"/>
</text:p>
<text:p text:style-name="Standard">
    ww
    <text:change-start text:change-id="ct-1352284360"/>
    fffff
    <text:change-end text:change-id="ct-1352284360"/>
    <text:change text:change-id="ct-1351224048"/>
    www
    <text:change-start text:change-id="ct-1352631944"/>
</text:p>
<text:p text:style-name="Standard">
    eeeeeeeeeeee
</text:p>
<text:p text:style-name="Standard">
    <text:change-end text:change-id="ct-1352631944"/>
</text:p>
<text:p text:style-name="Standard">
    bbbbbbbbbbbb
</text:p>
<text:p text:style-name="Standard"/>
</office:body>
```

If the above document illustrated in FIG. 3 is only a small portion of a much larger document, then, under an old approach, the entire document is saved. However, according to some embodiments, only those changes illustrated in FIG. 3 and stored in change 222 are saved.

Concurrent Online Editing

Figure 4:
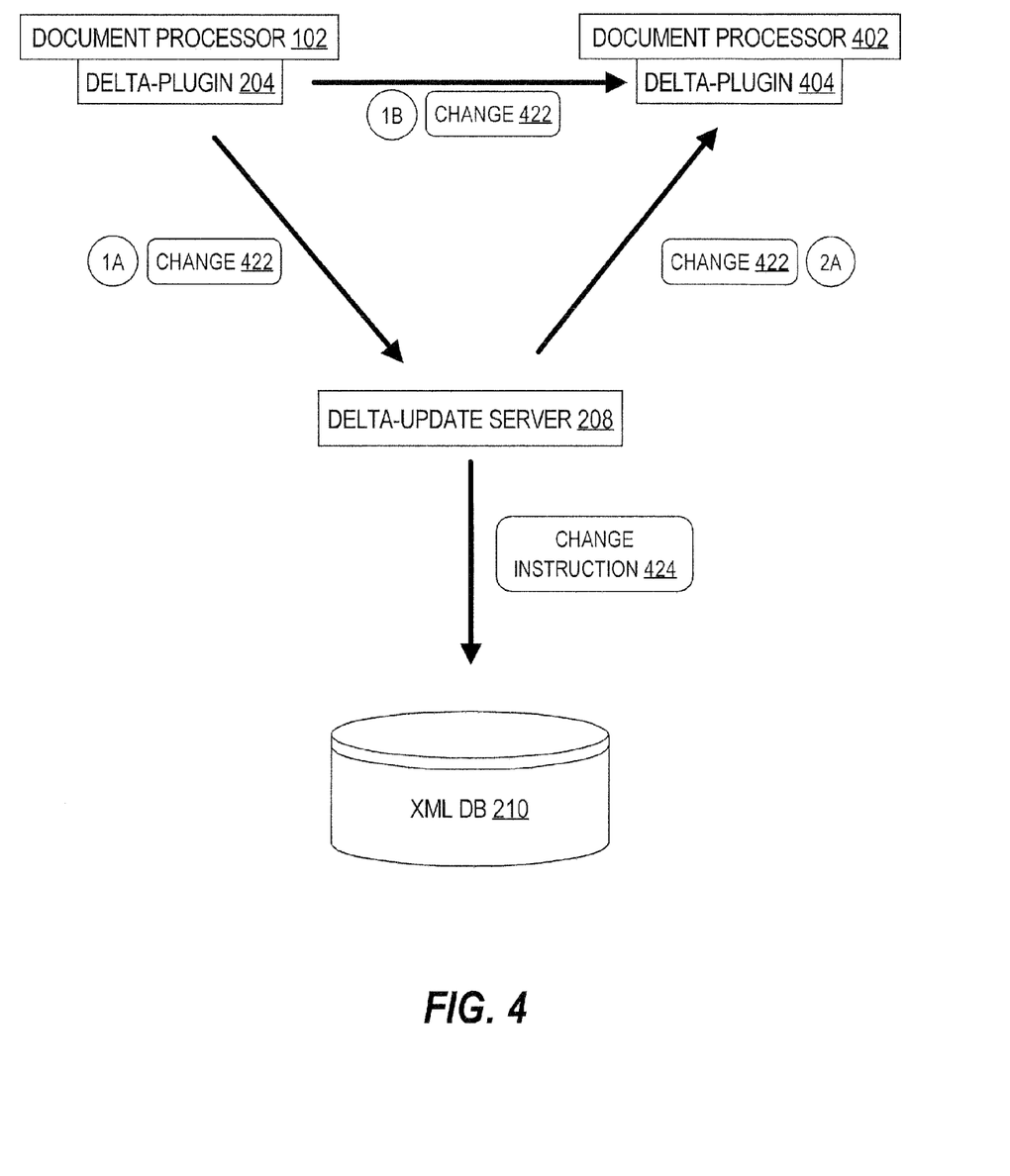
FIG. 4 illustrates how a change to a document may be shared among concurrent instances of the document, according to an embodiment of the invention.

FIG. 4 illustrates how a change to a document may be shared among concurrent instances of the document, according to an embodiment of the invention. As FIG. 4 illustrates, there are two different document processors (i.e., 102 and 402) that are utilized by two or more different users to display and modify documents that are stored on XML DB 210. A change issued by a user of document processor 102 may be viewed by the user of document processor 402 in at least two different ways, as follows.

According to either technique, document processor 102 and document processor 402 concurrently process (e.g., display) a particular document. A user of document processor 102 issues a change to the document. Delta-plugin 204 determines what node(s) of the document are affected by the change. Delta-plugin 204 generates a change 422. Change 422 is a record that identifies the node(s) in the document that are affected by the change.

According to one technique, delta-plugin 204 sends change 422 (e.g., via a network) to delta-update server 208. The sending of change 422 from delta-plugin 204 to delta-update server 208 is illustrated by reference numeral "1A." Delta-update server 208 determines that document processor 402 currently is processing (e.g., displaying) the particular document. As a result of this determination, delta-update server 208 sends change 422 to document processor 402 (or its associated delta-plugin 404). Delta-update server 208 also generates, based on change 422, a change instruction 424 and sends change instruction 424 to XML DB 210

Delta-plugin 404 parses change 422 (received from delta-update server 208) to determine which node(s) (i.e., in the copy of the document that document processor 102 is processing) are affected by the corresponding change. Document processor 402 applies the corresponding change to the appropriate node(s).

According to another technique, delta-plugin 204 is configured to determine whether other document processors are currently processing the same document. Delta-plugin 204 may makes this determination by querying delta-update server 208. Alternatively, delta-update server 208 may send data, to delta-plugin 204, that indicates one or more other document processors that are currently processing the same document (i.e., a copy of the same document) as document processor 102.

In response to determining that document processor 402 is currently processing the same document that document processor 102 is processing, delta-plugin 204 sends change 422 directly to delta-plugin 404 (e.g., via a network) as "1B" indicates. Thus, change 422 is not required to be routed through delta-update server 208 to delta-plugin 404.

Although FIGS. 2 and 3 illustrate embodiments of the invention where documents are stored remotely (e.g., in XML DB 210) relative to document processor 102, embodiments of the invention are also applicable to situations where documents are stored locally, such as the machine (or device) upon which document processor 102 is executing. In the local context, delta-update server 208 might not be necessary if the functionality of delta-update server 208 is built into delta-plugin 204. However, the decrease in the amount of system resources required to process changes to a DOM tree remains significant even when documents are persistently stored locally.

Hardware Overview

Figure 5:
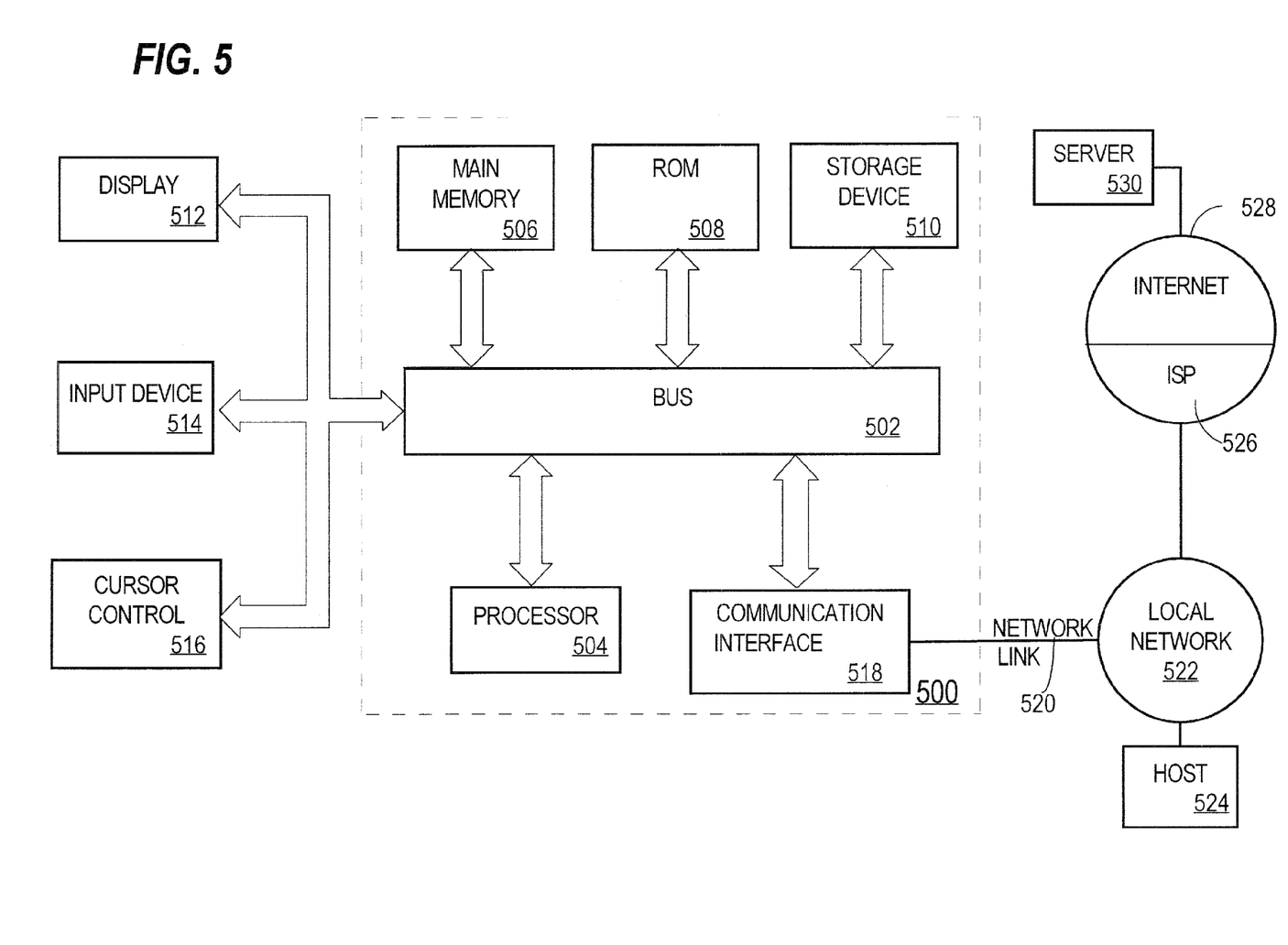
FIG. 5 illustrates a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving XML data over a network from a server;
    after receiving the XML data from the server, receiving input that indicates one or more changes to a portion of an in-memory representation of the XML data that corresponds to a plurality of elements of an XML document;
    wherein the one or more changes include at least one of an addition, a deletion, or an update;
    determining the portion affected by the one or more changes; and
    sending, to the server to be stored in persistent storage, data that indicates the one or more changes and the portion affected by the one or more changes without sending, to the server to be stored in the persistent storage, data that represents elements that are outside of the portion;
    wherein the method is performed by one or more computing devices.

2. The method of claim 1, wherein the sending is performed in response to a user's command to save the XML document.

3. The method of claim 1, wherein:
    the portion includes one or more nodes in the in-memory representation of the XML data; and
    the data includes a node identifier for each node of the one or more nodes.

4. The method of claim 1, wherein the steps of receiving, determining, and sending are performed by a plug-in to a document processor that generated the in-memory representation of the XML data.

5. The method of claim 1, wherein:
the method further comprising, before receiving the one or more changes, reading, from
the server, all the elements within the XML document.

6. The method of claim 1, wherein:
determining comprises comparing (a) a version of the XML document that lacks the one or more changes with (b) a version of the XML document that contains the one or more changes.

7. The method of claim 1, wherein:
the server is a database server;
the method further comprising generating a SQL statement which, when executed by the database server, causes the database server to update, in a database, elements that correspond to the portion of the in-memory representation of the XML document; and
sending comprises sending the SQL statement to the database server.

8. A machine-readable medium storing instructions which, when executed by one or more processors, causes:
receiving XML data over a network from a server;
after receiving the XML data from the server, receiving one or more changes to a portion of an an in-memory representation of the XML data that corresponds to a plurality of elements of an XML document;
wherein the one or more changes include at least one of an addition, a deletion, or an update;
determining the portion affected by the one or more changes; and
sending, to the server to be stored in persistent storage, data that indicates the one or more changes and the portion affected by the one or more changes without sending, to the server to be stored in the persistent storage, data that represents elements that are outside of the portion.

9. The machine-readable medium of claim 8, wherein the storing sending is performed in response to receiving a user's command to save the XML document.

10. The machine-readable medium of claim 8, wherein:
the portion includes one or more nodes in the in-memory representation of the XML data; and
the data includes a node identifier for each node of the one or more nodes.

11. The machine-readable medium of claim 8, wherein the steps of receiving, determining, and sending are performed by a plug-in to a document processor that generated the in-memory representation of the XML data.

12. The machine-readable medium of claim 8, wherein:
the instructions include instructions which, when executed by the one or more processors, further cause: before receiving the one or more changes, reading, from the server, all the elements within the XML document.

13. The machine-readable medium of claim 8, wherein:
determining comprises comparing (a) a version of the XML document that lacks the one or more changes with (b) a version of the XML document that contains the one or more changes.

14. The machine-readable medium of claim 8, wherein:
the server is a database server;
the instructions include instructions which, when executed by the one or more processors, further cause generating a SQL statement which, when executed by the database server, causes the database server to update, in a database, elements that correspond to the portion of the in-memory representation of the XML document; and
sending comprises sending the SQL statement to the database server.

15. A method comprising:
receiving, from a client, a request for a document;
in response to receiving the request, retrieving at least a portion of the document from persistent storage and sending the portion to the client;
after sending the portion to the client, receiving, from the client, one or more changes to be made to the document;
wherein the one or more changes include at least one of an addition, a deletion, or an update;
determining a particular portion of the document that is affected by the one or more changes; and
causing, to be stored in the persistent storage, data that indicates the one or more changes and the particular portion of the document affected by the one or more changes without causing, to be stored in the persistent storage, any portion of the document that is outside of the particular portion;
wherein the method is performed by one or more computing devices.

16. The method of claim 15, wherein:
sending comprises translating the one or more changes into one or more change instructions that are in a format that is different than the format of the one or more changes.

17. The method of claim 15, further comprising:
determining a set of devices on which a different copy of the portion of the in-memory representation is being edited; and
sending, to each device in the set of devices, the data that represents the portion.

18. A machine-readable medium storing instructions which, when executed by one or more processors, cause:
receiving, from a client, a request for a document;
in response to receiving the request, retrieving at least a portion of the document from persistent storage and sending the portion to the client;
after sending the portion to the client, receiving, from the client, one or more changes to be made to the document;
wherein the one or more changes include at least one of an addition, a deletion, or an update;
determining a particular portion of the document that is affected by the one or more changes; and
causing, to be stored in the persistent storage, data that indicates the one or more changes and the particular portion of the document affected by the one or more changes without causing, to be stored in the persistent storage, any portion of the document that is outside of the particular portion.

19. The machine-readable medium of claim 18, wherein:
sending comprises translating the one or more changes into one or more change instructions that are in a format that is different than the format of the one or more changes.

20. The machine-readable medium of claim 18, wherein the instructions include instructions which, when executed by the one or more processors, further cause:
determining a set of devices on which a different copy of the portion of the in-memory representation is being edited; and
sending, to each device in the set of devices, the data that represents the portion.

* * * * *

UNITED STATES PATENT AND TRADEMARK OFFICE
CERTIFICATE OF CORRECTION

| | | |
|---|---|---|
| PATENT NO. | : 8,291,310 B2 | |
| APPLICATION NO. | : 11/847213 | |
| DATED | : October 16, 2012 | |
| INVENTOR(S) | : Duan | |

It is certified that error appears in the above-identified patent and that said Letters Patent is hereby corrected as shown below:

In column 1, line 41, delete "K*8" and insert -- KB*8 --, therefor.

In column 8, line 2, delete "210" and insert -- 210. --, therefor.

In column 11, line 26, in Claim 8, delete "an an" and insert -- an --, therefor.

Signed and Sealed this
First Day of January, 2013

David J. Kappos
*Director of the United States Patent and Trademark Office*